(12) United States Patent
Garcia

(10) Patent No.: US 10,041,019 B2
(45) Date of Patent: Aug. 7, 2018

(54) DRILLING FLUID SYSTEM

(71) Applicant: Continental Automotive Systems, Inc., Auburn Hills, MI (US)

(72) Inventor: Valentin Garcia, Manassas, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 92 days.

(21) Appl. No.: 14/880,694

(22) Filed: Oct. 12, 2015

(65) Prior Publication Data

US 2016/0102268 A1 Apr. 14, 2016

Related U.S. Application Data

(60) Provisional application No. 62/062,464, filed on Oct. 10, 2014.

(51) Int. Cl.
C10M 173/00 (2006.01)
C09K 8/04 (2006.01)

(52) U.S. Cl.
CPC ............ C10M 173/00 (2013.01); C09K 8/04 (2013.01); *C09K 2208/34* (2013.01); *C10M 2203/106* (2013.01); *C10M 2203/1065* (2013.01); *C10M 2207/021* (2013.01); *C10M 2207/022* (2013.01); *C10M 2207/122* (2013.01); *C10M 2207/123* (2013.01); *C10M 2207/125* (2013.01); *C10M 2207/126* (2013.01); *C10M 2207/18* (2013.01); *C10M 2207/28* (2013.01); *C10M 2207/2805* (2013.01); *C10M 2207/40* (2013.01); *C10M 2207/401* (2013.01); *C10M 2209/104* (2013.01); *C10M 2215/042* (2013.01); *C10M 2215/223* (2013.01); *C10M 2219/024* (2013.01); *C10M 2219/044* (2013.01); *C10M 2223/04* (2013.01); *C10M 2229/02* (2013.01); *C10N 2210/02* (2013.01); *C10N 2230/18* (2013.01); *C10N 2230/40* (2013.01); *C10N 2230/41* (2013.01); *C10N 2230/44* (2013.01); *C10N 2230/70* (2013.01); *C10N 2240/40* (2013.01)

(58) Field of Classification Search
CPC ............ C10N 2040/20; C10N 2040/24; C10N 2240/40
See application file for complete search history.

(56) References Cited

U.S. PATENT DOCUMENTS

| | | | | |
|---|---|---|---|---|
| 4,264,458 A | * | 4/1981 | Campbell | ............ C10M 169/04 508/133 |
| 5,399,274 A | * | 3/1995 | Marcus | ................ C10M 173/02 508/195 |
| 7,666,295 B2 | * | 2/2010 | Patrick | ..................... H01B 3/22 208/18 |
| 9,371,495 B2 | * | 6/2016 | Hansen | .................. C10G 45/44 |
| 9,453,178 B2 | * | 9/2016 | McCreery | ............ B65D 83/752 |
| 2009/0036333 A1 | * | 2/2009 | Scholier | ............... C10M 107/02 508/110 |
| 2009/0036338 A1 | * | 2/2009 | Hee | ....................... C10M 107/02 508/506 |
| 2009/0209441 A1 | * | 8/2009 | Lange | .................. C10M 159/12 508/239 |
| 2011/0162425 A1 | * | 7/2011 | Hof | ..................... B01F 17/0021 72/42 |
| 2012/0010113 A1 | * | 1/2012 | Hee | ...................... C10M 111/04 508/400 |
| 2013/0150271 A1 | * | 6/2013 | Evans | ............... C10M 169/048 508/195 |

* cited by examiner

*Primary Examiner* — Ellen M McAvoy

(57) ABSTRACT

An aqueous based metalworking fluid that is environmentally friendly and process for metalworking with the fluid. The metalworking fluid is sampled at periodic intervals and replenished to predetermined operating specifications with the aqueous based metalworking fluid without the need for individual boosters.

18 Claims, No Drawings

DRILLING FLUID SYSTEM

CROSS-REFERENCE TO RELATED APPLICATIONS

This application claims the benefit of U.S. Provisional Application No. 62/062,464, filed Oct. 10, 2014. The disclosure of the above application is incorporated herein by reference.

FIELD OF THE INVENTION

The present invention relates to a drilling fluid for manufacturing operations and a method regarding same.

BACKGROUND OF THE INVENTION

Many manufacturers use large amounts of drilling and/or metalworking fluids in their manufacturing operations. Many of these fluids have been found to be noxious or potentially hazardous to workers in these environments. Additionally, some of the fluids or ingredients therein can be damaging to hydraulic seals and the like used in the manufacturing operations.

Additionally, it is common practice and knowledge that the metalworking fluids used in the past have limited life. Typically, the fluids would require disposal due to contaminants and reductions in useful metalworking properties. Therefore, a production line would experience down time during changes of fluids. This resulted in loss of efficiencies and lost revenue due to the down time. Additionally, storage, replacement and disposal of the metalworking fluids is extremely costly, particularly in a large scale manufacturing environment.

Common manufacturing operations are conducted for a predetermined period of time using conventional drilling and/or metalworking fluids. The fluids must be sampled after some time to determine specific properties of the fluid property characteristics in order to determine the additions that need to be made to bring the fluid up to predetermined operating specifications. Thereafter, various booster mixtures of predetermined constituents are prepared based on restoring the properties of the metalworking fluid, e.g., restoring defoamer, viscosity booster/reducer, rheology lubricity, water hardener, polymer foam control, ester phosphorous, etc. And finally, the booster(s) is/are added to the reservoir for restoring original properties to the metalworking fluid mixture and the manufacturing operation for a predetermined period of time.

Therefore, there exists a need in the art to provide longer lasting metalworking fluid systems that are more environmentally friendly, eliminate the need for boosters, provide metalworking benefits and do not require costly down time for boosting, changing and disposal of used fluids.

SUMMARY OF THE INVENTION

A method for preserving the life of a metalworking fluid in a manufacturing operation and a novel metallurgical metalworking fluid is provided herein. The method includes the following steps. Providing a manufacturing operation including a metalworking fluid reservoir for supplying metalworking fluid to the manufacturing operation is first provided. The metalworking fluid reservoir is filled with a replenishable semi synthetic water based metalworking fluid. The metalworking fluid includes a preselected combination of constituents including, severely hydrotreated naphthenic oil, monoethanolamine, monoisopropanolamine, polyoxyethylene alkyl ether phosphate, tall oil fatty acid, calcium acetate and water, and, compounds directed to viscosity boosting, rheology, viscosity reducing, defoaming, lubricity, water hardening and polymer foam control, and/or combinations thereof.

The manufacturing operation is conducted for a predetermined period of time using the water based metalworking fluid. The fluid is sampled after a predetermined time to determine specific properties of the fluid property characteristics in order to determine the additions that need to be made to bring the fluid up to predetermined operating specifications and/or, most preferably, to determine the concentration of the metalworking fluid. Thereafter, the water based metalworking fluid having the above constituents/compounds is added based on restoring the properties of the water based metalworking fluid, without any need to additionally prepare or add booster(s) to the reservoir for restoring original properties to the water based metalworking fluid mixture and the manufacturing operation for a predetermined period of time.

Further areas of applicability of the present invention will become apparent from the detailed description provided hereinafter wherein all percentages are by volume unless indicated otherwise. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

A method for preserving the life of a metalworking fluid in a manufacturing operation and a novel metallurgical metalworking fluid is provided herein. The method includes the following steps. A metalworking fluid is first provided. A manufacturing operation including a metalworking fluid reservoir for supplying the metalworking fluid to the manufacturing operation is provided. The metalworking fluid reservoir is filled with the metalworking fluid, which is a replenishable semi synthetic water based metalworking fluid. The metalworking fluid includes water and a preselected combination of constituents. The manufacturing operation is conducted for a predetermined period of time using the metalworking fluid. The fluid is sampled after predetermined times to determine fluid concentration and what additional amount of metalworking fluid needs to be added to bring the fluid up to predetermined operating specifications. Thereafter, the metalworking fluid is added to the reservoir for restoring original properties to the metalworking fluid mixture and the manufacturing operation for a predetermined period of time.

Depending on the application, typically, the drilling fluid of the drilling/cutting devices are sampled every 2-4 days, preferably, daily, most preferably, at least once each day. Generally, if a concentration of the drilling fluid is below a predetermined optimum level, e.g., 7%, the concentration must improve within a predetermined time, e.g., to a level above 7% by the next scheduled sample, or production is stopped and suitable corrections to the concentration made. Typically, the desirable concentration is between 11.6 and 7.0%, preferably, below about 11% and greater than 7.0%, most preferably, between 8.0 and 11.0%.

Concentration percentages of the metalworking fluid are determinable with a refractotometer to provide a predetermined desired concentration of metalworking fluid compound depending on the particular application. By way of non-limiting example, a refracotometer reading of 1.5 is about 2% concentration, 3 is about 4%, about 6.1 is about 8%, and about 7.7 is 10%.

In a one embodiment the metalworking fluid concentration recommended for primary machines (aggressive programs and tools), e.g., PDC Diamond and Diamond is: Generally, Min=8% (Other prior art systems=11+%); typically, Max=11% (Other prior art systems=16%); and preferably, 9.6/10% (Other prior art systems=14%/14+%).

In another embodiment the metalworking fluid concentration recommended for secondary machines (less aggressive parameters and tools) is: Generally, Min=7% (Other prior art systems=11%); typically, Max=10% (Other prior art systems=15+%); and preferably, 8.0/9.0% (Other prior art systems=13+%).

The metalworking and/or "drilling" fluid of the present invention is structured to support no foam, despite the use of centrifugal pumps in some applications, is water soluble, and also capable of tolerating high insurgencies of high hardness content with any surface or well water. Additionally, the Mean Torque Newton per centimeters (Ncm) is reduced to at least as low as 195 Ncm, which is a significant advantage over conventional systems only having a reduction to 210 Ncm. The lower Ncm is for optimum finish to product quality. The inventive fluid is also up to 100% environmentally friendly, which is best for human resources.

According to one embodiment the metallurgical cutting fluid of the present invention generally has predetermined amounts of at least phosphorus, barium, calcium, potassium, sodium and any additional elements in combination suitable to provide desired properties and characteristics for cutting and/or drilling in a manufacturing operation, e.g. water-based, oil-based, synthetic, semi synthetic, inverted, etc. processing. Preferably, the drilling fluid composition includes 1490-1690 parts per million (PPM) phosphorus, 2290-2490 PPM barium, 1132-1332 PPM calcium, 100-124 PPM potassium, and 200-260 sodium. Most preferably, the drilling fluid composition includes 1590 PPM phosphorus, 2390 PPM barium, 112 PPM calcium, 239 PPM potassium, and 200-260 sodium. FTIR: Hydrocarbon Oil, Mixed Esters, Amines (MEA=Monoethanolamine H0CH2CH2NH2+, MIPA=Monoisopropanolamine Dispersant), Tall oil fatty acid soap, Ethoxylated alcohol, Hydrocarbon wax. Physical Properties, preferably, include: pH 5%=9.42; Refrac @ 5%=3.9.Cast Iron Chip Test @ 5%=Pass; Total Acid Number=51.05 (TAN): Number of mg of KOH needed to neutralize the acids in one gram of the Oil; Total Base Number=78.5 (TNB): Represents the total mg per gram of free KOH in an oil. It measures a lubricant's reserve alkalinity. The metallurgical fluid of the present invention is a low oil content 35%, Naphthenic, 20CST, Visc=93%, semi-synthetic using an anionic emulsifier and nonionic secondary emulsifier. Lubricity is enhanced with mixed esters as well as phosphate ester. Alkalinity is based on primary amines (MEA+MIPA), defoamer is wax+calcium, barium salts of stearic acid, and a modified water soluble polymer. The Lubricity Elements; Oil, Ester, Amide, Phos Ester, Fatty Acid, Soaps. all have natural affinity towards metals, will tend to migrate from water phase to metal surfaces. This provides superior cutting properties.

The features and process described herein are suitable to allow application to any other manufacturing operation where drilling and/or cutting is desired. Such applications include, but are not limited to, fluid management while drilling/cutting metal, etc for powertrain, chassis, safety, etc components during water-based, oil-based, synthetic, semi synthetic, inverted, etc. drilling/cutting manufacturing operations.

The capability to create/work with the fluid dynamics depending on the needs of the particular application provides significant benefits to performance while minimizing cost and creating an effective and environmentally friendly solution. Another significant advantage is the ability to selectively clean at least one bore while drilling by creating and controlling the fluid dynamics, e.g., viscosities, plastic viscosity, yield point, funnel viscosity, gels) to control the slip velocity of the cuttings, e.g., chips.

The term "Viscosity" used herein refers to the internal resistance of fluid flow. "Funnel viscosity" used herein serves as a qualitative measure of how thick the fluid sample is. "Plastic viscosity" used herein refers to a parameter of the Bingham plastic rheological model, and is the slope of the shear stress-shear rate plot above the yield point. "Yield point" used herein refers to, physical meaning, the resistance to initial flow, or the stress required starting fluid movement. "Gel strength" used herein refers to the ability of fluid to suspend while fluid is in static condition.

Depending on the application, all these properties are manageable and/or created, in any drilling fluid device/system, e.g., water based, oil based, synthetic, semi synthetic, inverted. Most important, is the fluid management control for its application. The fluid management control is a significant benefit over conventional systems.

Other benefits include corrosion prevention for parts and machine tools, stain protection on common aluminum alloys and better foam in high pressure.

Accordingly, due to the many variables encountered during operation, fluid is sampled at predetermined intervals for properties and the emulsion stability, then the required quantity of the metalworking fluid needed to bring the system within mean is determined. Application parameters will depend on where the system is used, for better performance and cost. There are numerous variables within the same or different manufacturing systems, such as temperature, pressures, flows, mechanical issues, dilution issues, top water hardness, dehydration, needing to apply rheology, or disperse the fluid to reject insurgencies of unwanted contaminants, etc. A significant benefit of the present invention consists on its bond with needed elements to continue operation, e.g., drilling, without needing to stop, and its benefits for its ambient and environment.

The fluid and system of the present invention has better performance due to its components which reject all free oils or elements not meant to be in the formulation, and therefore, has better cleanliness. The fluid is created to operably bond with components to build/control a rheology (control of the fluid viscosities, fluid properties), at the same time dispersed to settle particles smaller than 5 mic. This prolongs the life of the fluid and tooling. The fluid is easily custom formulated with additives/concentrations to be able to work with properties depending on the need of the program/application.

Environmentally, the fluid and system of the present invention is secondary amine free. This is important since some secondary amines can react with nitrites to form nitrosamines which may be carcinogenic. While not all secondary amines form these compounds, by eliminating secondary amines entirely, this potential health hazard is avoided.

The fluid and system of the present invention is also boron free; Boron in metalworking fluid generally comes from boric acid which has been designated as a substance of very high concern (SVHC) under REACH. In metalworking fluids boric acid is compounded with other materials which is avoided in the present invention by eliminating boron from the metalworking fluid of the present invention.

Tramp oil rejection is also facilitated by the subject invention. Emulsified tramp oil in metalworking fluids, can contribute to biological growth, emulsion instability, skin irritation, and degraded drilling fluid performance; hence tramp oil rejection and removal vial oil skimmer, oil absorbent media, is desirable.

Further advantages of the present invention are shown in the examples set forth below.

Example 1

The fluid of the present invention provides higher alkalinity than comparable fluids of the prior art. A comparative example test table is set forth below in Table 1, alkalinity of other products and subject metalworking fluid.

Metallurgical cutting fluid baths are formulated using a known prior art aqueous mixture and the alkalinity is titrated at various concentration levels which are set forth in the first row in Table 1 below. The metalworking fluid of the present invention is added to water to match the alkalinity in the first column. The percentage of subject metalworking fluid (by volume) which creates the same alkalinity of the prior art metallurgical fluid is set forth in the second column.

As is demonstrated by the comparative test results in Table 1 below, on a per unit basis, the subject metalworking fluid has more alkalinity than the other products known in the market. This is the reason that for any given titration, the measured amount of titrant will equate to a higher percent of other products (Systems) than the subject metalworking fluid.

Another way to think of it is that it would take more of the other systems' product than the subject metalworking fluid (on a volume or percentage basis) to provide a certain amount of alkalinity.

TABLE 1

Concentration Comparison table, Based on Total Alkalinity Titration:
CONCENTRATION COMPARISON

| Others | Metalworking Fluid |
| --- | --- |
| 8% | 5.5% |
| 9% | 6.1% |
| 10% | 6.9% |
| 11% Min | 7.6% Min |
| 12% | 8.2% |
| 13% | 8.9% |
| 14% Target | 9.6% Target |
| 15% | 10.3% |
| 16% Max. | 11.0% Max. |
| 17% | 11.6% |

Example 2

Metalworking fluids are prepared using the following parameters: 11%, 9.6%, 10% and 8% of the metalworking fluid. These concentrations are superior for use in primary machines (aggressive programs and tools) such as those cutting with PDC diamond and diamond or diamond like hardness cutting tools Example 3

Metalworking fluids are prepared using the following parameters: 7, 8.0, 9.0 and 10% of the metalworking fluid. These metallurgical fluids are found to be superior for use in less aggressive machines using carbide tools and the like.

Referring further to the metalworking fluid of the present invention, typically, a suitable fluid composition is used which is a high lubricity semi-synthetic metalworking fluid. This fluid is a chlorine, secondary amine and boron free, premium grade high oil-semi-synthetic metalworking fluid (e.g., semi-synthetic coolant) and is formulated with polar lubricity agents that provide outstanding performance in a wide variety of metals, e.g., ferrous and non-ferrous alloys.

An exemplary fluid composition includes severely hydrotreated naphthenic oil, monoethanolamine, and monoisopropanolamine, and is completely soluble in water. Generally, additional constitutes must be used in the metalworking fluid, including, water and one or more of the following or other suitable components. Typically, a suitable ester phosphorous composition is used, preferably, a polyoxyethylene alkyl ether phosphate that is soluble in water. Typically, a suitable copolymer composition is used, e.g., operable as viscosity booster and/or rheology, preferably, including a polyoxyethylene copolymer that is soluble in water. Typically, a suitable composition is used, e.g., operable as viscosity reducer, rheology, defoamer, lubricity, and/or dispersant, that is soluble in water, e.g., tall oil fatty acid amine soap, etc. Typically, a suitable water hardener composition is used, including a calcium acetate, and is completely soluble in water. Typically, a suitable polymer foam control composition is used.

The metalworking fluids of the present invention are found to replace prior art metallurgical fluid concentrations of much greater quantities and eliminate the need for boosters to boost any of the properties.

The suitable metalworking fluid composition also delivers the performance benefits of soluble oil while providing the cleanliness, microbiological control and cooling characteristics of a semi-synthetic compound. It is also low foaming and exceptional for use with high pressure coolant delivery systems. If required, the fluid composition is adjustable with predetermined supplemental additions to meet predetermined difficult performance criteria.

The metalworking fluid has excellent performance features and benefits, including, that the fluid is versatile (useable in a wide range of machining applications), has multi-metal capability (suitable for use with ferrous and non-ferrous materials which reduces fluid selection complexity, and/or compatibility with all metals), has excellent lubricity (improved tool like and machine tool maintenance as well as superior surface finish), has hard water stability (stable in a wide range of water conditions which increases the longevity of the operating system), and has excellent corrosion protections (provides in-process rust protection for ferrous and non-ferrous applications which results in equipment durability and reduced cost due to down time because of scrapped parts and rework. The metalworking fluid also improves work environment features and benefits, including, longer sump life (excellent bioresistance leading to extended sump life and reduced waste volumes requiring disposal), and greater cleanliness (greater detergency action resulting in cleaner machines and work pieces in addition to improved visibility into the machine).

It is preferred that the density (pounds/gallon) is generally 5-10, typically, 7-9, preferably, 7-8, most preferably, about 7.8. It is preferred that the specific gravity at 60° F. is generally 0.6-1.1, typically, 0.8-1.0, preferably, 0.9-1.0, most preferably, about 0.94. The pH @ 10% is generally 8-10, typically, 9-10, preferably 9.5-10.

In a preferred embodiment, a suitable fluid composition is provided that is a high lubricity semi-synthetic metalworking fluid having at least the following ingredients of Severely Hydrotreated Naphthenic Oil (generally, 33-42 wt. %, typically, 35-39 wt. %, preferably, 36-39 wt. %), Vegetable Oil and Esters (generally, 5-15 wt. %, typically, 8-12 wt. %, preferably, 9-11 wt. %), Petroleum Sulfonic Acid Sodium Salt (generally, 2.0-3.2 wt. %, typically, 2.5-3.0 wt. %, preferably, 2.7-2.9 wt. %), Succinic Acid Anhydride Sodium Salt (generally, 1.0-2.2 wt. %, typically, 1.5-2.0 wt. %, preferably, 1.7-1.95 wt. %), Sulfated Castor Oil (generally, 4.0-5.0 wt. %, typically, 4.2-4.6 wt. %, preferably, 4.35-4.45 wt. %), Tall Oil Fatty Acid (generally, 1.0-3.0 wt. %, typically, 1.3-2.8 wt. %, preferably, 1.4-1.6 wt. %), $C_{23}$ Fatty Alcohol (generally, 3.0-4.0 wt. %, typically, 3.5-4.0 wt. %, preferably, 3.7-3.9 wt. %), Fatty Alcohol Ethoxylate (generally, 3.0-4.0 wt. %, typically, 3.5-4.0 wt. %, preferably, 3.7-3.95 wt. %), Monoisopropanolamine (generally, 1.0-1.8 wt. %, typically, 1.1-1.5 wt. %, preferably, 1.2-1.4 wt. %), Monoethanolamine (generally, 1.0-2.2 wt. %, typically, 1.5-2.0 wt. %, preferably, 1.7-1.9 wt. %), Ethoxylated Cyclohexlamine (generally, 5.9-6.5 wt. %, typically, 6.0-6.4 wt. %, preferably, 6.1-6.3 wt. %), Polyoxyethylene Alkyl Ether Phosphate (generally, 2.9-4.0 wt. %, typically, 3.1-3.5 wt. %, preferably, 3.4-3.6 wt. %), Tolytriazole Sodium Salt (generally, 0.25-0.95 wt. %, typically, 0.5-0.9 wt. %, preferably, 0.65-0.85 wt. %), Calcium Acetate Salt (generally, 0.25-0.95 wt. %, typically, 0.5-0.9 wt. %, preferably, 0.5-0.6 wt. %), Modified Siloxane Polymer (generally, 0.08-0.5 wt. %, typically, 0.1-0.4 wt. %, preferably, 0.1-0.3 wt. %), and water generally, 10-30 wt. %, typically, 15-26 wt. %, preferably, 18-22 wt. %). Most preferably, additionally having one or more of the ingredients Polyoxyethylene Alkyl Ether Carboxylate (generally, 0.25-0.95 wt. %, typically, 0.5-0.9 wt. %, preferably, 0.2-0.4 wt. %), Stearate Amine (generally, 0.08-0.5 wt. %, typically, 0.1-0.4 wt. %, preferably, 0.15-0.35 wt. %), and Vinyl diol (generally, 0.07-0.25 wt. %, typically, 0.08-0.2 wt. %, preferably, 0.09-0.15 wt. %).

In a most preferred embodiment, the metalworking fluid is a water base drilling fluid, which includes the constituents and weight percentages set forth in Table 2.

TABLE 2

Metalworking Fluid:

| Contituents | Weight Percentage |
|---|---|
| Severely Hydrotreated Naphthenic Oil | 37.00 |
| Vegetable Oil and Esters | 10.00 |
| Petroleum Sulfonic Acid Sodium Salt | 2.80 |
| Succinic Acid Anhydride Sodium Salt | 1.85 |
| Sulfated Castor Oil | 4.40 |
| Tall Oil Fatty Acid | 1.50 |
| $C_{23}$ Fatty Alcohol | 3.80 |
| Fatty Alcohol Ethoxylate | 3.85 |
| Monoisopropanolamine | 1.30 |
| Monoethanolamine | 1.80 |
| Ethoxylated Cyclohexlamine | 6.20 |
| Polyoxyethylene Alkyl Ether Phosphate | 3.50 |
| Tolytriazole Sodium Salt | 0.75 |
| Calcium Acetate | 0.40 |
| Modified Siloxane Polymer | 0.20 |
| Polyoxyethylene Alkyl Ether Carboxylate | 0.30 |
| Stearate Amine | 0.25 |
| Vinyl diol | 0.10 |
| Water | 20.00 |

The formula and structural ingredients/constituents are also most preferably as follows.

Severely Hydrotreated Naphthenic Oil: There is no specific formula as this is a complex mixture or C20 to C50 hydrocarbons containing very little normal paraffins.

Vegetable Oil and Esters: This ingredient is a complex mixture of triglycerides and methyl esters with structure as outlined below.

Methyl ester is most preferably represented by formula (I). Formula (I) is defined by

$$CH_3(CH_2)_nCH=CH(CH_2)_nCOOCH_3 \qquad (I)$$

Where: n is 6 to 7

Triglyceride most preferably has the following formula (II).

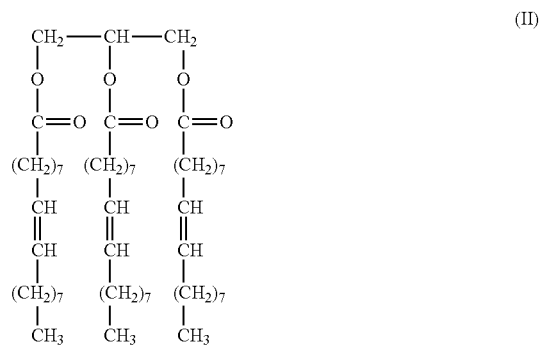

Petroleum Sulfonic Acid Sodium Salt: is most preferably represented by formula (III). Formula (III) is defined by

$$RSO3Na \qquad (III)$$

Where R is a complex mixture of hydrocarbons with an average molecular weight of 410

Succinic Acid Anhydride Sodium Salt: is most preferably represented by formula (IV). Formula (IV) is defined by

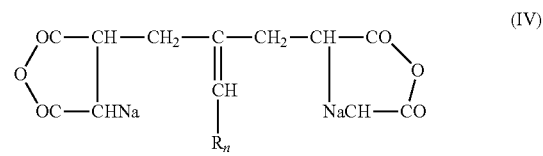

Where R is polyisobutylene polymer, n=1 to 30

Sulfated Castor Oil: most preferably has the following formula (V)

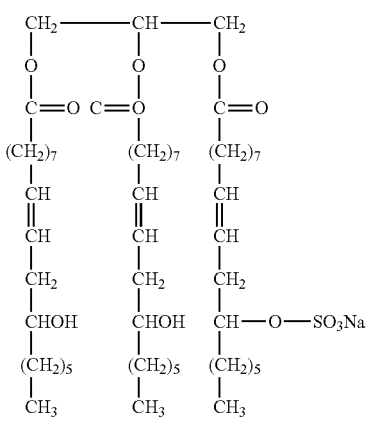

(V)

Tall Oil Fatty Acid: is most preferably represented by formula (VI). Formula (VI) is defined by $$CH_3(CH_2)_nCH=CH(CH_2)_nCOOH \quad (VI)$$

Where n=6 to 7

Fatty Alcohol: is most preferably represented by formula (VII). Formula (VII) is defined by $$CH_3(CH_2)_nOH \quad (VII)$$

Where n=11 to 13

Fatty Alcohol Ethoxylate: is most preferably represented by formula (VIII). Formula (VIII) is defined by $$CH_3(CH_2)_nO(CH_2CH_2O)_fH \quad (VIII)$$

Where n=11 to 15 and f=7 to 11

Monoisopropanolamine: is most preferably represented by formula (IX). Formula (IX) is defined by $$CH_3-CHOH-CH_2NH_2 \quad (IX)$$

Monoethanolamine: is most preferably represented by formula (X). Formula (X) is defined by $$OH(CH_2)_2NH_2 \quad (X)$$

Ethoxylated Cyclohexylamine: is most preferably represented by formula (XI). Formula (XI) is defined by $$C_6H_{11}N(CH_2CH_2O)nH_2 \quad (XI)$$

Where n=2 to 3

Polyoxyethylene Alkyl Ether Phosphate: is most preferably represented by formula (XII). Formula (XII) is defined by $$[CH_3(CH_2)_nO(CH_2CH_2O)_f]_yH_{3-y}PO4 \quad (XII)$$

Where n=11 to 13 and f=2 to 4 and y=1 to 2

Tolytriazole Sodium Salt: is most preferably represented by formula (XIII). Formula (XIII) is defined by $$C_7H_6N_3Na \quad (XIII)$$

Calcium Acetate: is most preferably represented by formula (XIV). Formula (XIV) is defined by $$Ca(C_2H_3O_2)_2 \quad (XIV)$$

Modified Siloxane Polymer: is most preferably represented by formula (XV). Formula (XV) is defined by $$(CH_3)_3SiO[(CH_3)_2SiO]_n[CH_3SiOR]_mSi(CH_3)_3 \quad (XV)$$

Where n is 12 or greater, m is 1 or greater and R is a $C_1$ to $C_{10}$ hydrocarbon Polyoxyethylene Alkyl Ether Carboxylate is most preferably represented by formula (XVI). Formula (XVI) is defined by $$R-O-(CH_2CH_2O)_nCH_2COOH \quad (XVI)$$

Where R is $C_{10}$ to $C_{14}$, n=3 to 5

Stearate Amine is most preferably represented by formula (XVII). Formula (XVII) is defined by $$CH_3(CH_2)_{16}COO^-(OH(CH_2)_2NH_4^+) \quad (XVII)$$

Vinyl Diol is most preferably represented by formula (XVIII). Formula (XVIII) is defined by $$C_{14}H_{26}O_2 \quad (XVIII)$$

In view of the foregoing elements formulated in the water based metalworking/drilling fluid, there is no need to boost any of the desired properties. Rather, additional amounts of the fluid are used as needed. The water based metalworking/drilling fluid has several desired attributes, including, being completely environmentally friendly, with high tramped oils release capabilities (machines will always leak oils, which may be a cause of poor performance and/or poor quality product finish, and, may be the cause of skin problems for the human resources working with the machines). Further, the defoamer was adjusted to extremely high turbulences, e.g., as the one caused by centrifuges pumps. This dispersant molecule is anionic on one end and has ethoxylation on the other end. Thus, it remains water soluble in all water conditions since the anionic end can react with cations and remain in solution, and prevent any formulated elements from making water insoluble. With this metalworking/drilling fluid being water based, the combination of all the constituents results in the fluid tolerating up to 500 ppm (parts per million) of hardness coming from soft or hard waters.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A fluid composition for drilling or metalworking in a manufacturing operation, comprising:
    a predetermined amount of severely hydrotreated naphthenic oil;
    a predetermined amount of monoethanolamine;
    a predetermined amount of monoisopropanolamine;
    a predetermined amount of polyoxyethylene alkyl ether phosphate;
    a predetermined amount of tall oil fatty acid;
    a predetermined amount of calcium acetate;
    a predetermined amount of water; and
    compounds of predetermined amounts selected from the group consisting of a water hardener, polymer foam controller, viscosity enhancer, rheological, viscosity reducer, defoamer, lubricant, dispersant, and/or combinations thereof;
    wherein a mixture of the predetermined amounts and structure of the constituents is operable for providing a metalworking and/or drilling fluid that is soluble in water, and, has higher tramped oil release, defoams in high turbulence environments, and/or tolerates high insurgencies of high hardness content of water to remain water soluble under predetermined conditions.

2. The fluid composition of claim 1, wherein the compounds of the fluid composition comprise:

a predetermined amount of vegetable oil and esters;
a predetermined amount of petroleum sulfonic acid sodium salt;
a predetermined amount of succinic acid anhydride sodium salt;
a predetermined amount of sulfated castor oil;
a predetermined amount of $C_{23}$ fatty alcohol;
a predetermined amount of ethoxylated cyclohexlamine;
a predetermined amount of tolytriazole sodium salt; and
a predetermined amount of modified siloxane polymer; and
wherein the compounds are soluble in the water.

3. The fluid composition of claim 2, further comprising predetermined amounts of polyoxyethylene alkyl ether carboxylate, stearate amine and vinyl diol, respectively, which are soluble in the water.

4. The fluid composition of claim 3, wherein the fluid composition includes
33-42 wt. % of the severely hydrotreated naphthenic oil, that is a complex mixture or C20 to C50 hydrocarbons containing very little normal paraffins;
5-15 wt. % of the vegetable oil and esters, that is a complex mixture of triglycerides and methyl esters;
2.0-3.2 wt. % of the petroleum sulfonic acid sodium salt;
1.0-2.2 wt. % of the succinic acid anhydride sodium salt;
4.0-5.0 wt. % of the sulfated castor oil;
1.0-2.2 wt. % of the monoethanolamine;
1.0-1.8 wt. % of the monoisopropanolamine;
2.9-4.0 wt. % of the polyoxyethylene alkyl ether phosphate;
1.0-3.0 wt. % of the tall oil fatty acid;
3.0-4.0 wt. % of the $C_{23}$ fatty alcohol;
5.9-6.5 wt. % of the ethoxylated cyclohexlamine
0.25-0.95 wt. % of the calcium acetate;
0.25-0.95 wt. % of the tolytriazole sodium salt;
0.08-0.5 wt. % of the modified siloxane polymer;
0.25-0.95 wt. % of the polyoxyethylene alkyl ether carboxylate;
0.08-0.5 wt. % of the stearate amine;
0.07-0.25 wt. % of the vinyl diol; and
15-30 wt. % of the water; and
wherein the fluid composition is water based and completely soluble in water of the manufacturing operation.

5. The fluid composition of claim 4, wherein the methyl ester is a compound of formula (I)

$$CH_3(CH_2)_nCH=CH(CH_2)_nCOOCH_3 \qquad (I)$$

where "n" is 6 to 7.

6. The fluid composition of claim 4, wherein the petroleum sulfonic acid sodium salt is a compound of formula (III)

$$RSO_3Na \qquad (III)$$

where "R" is a complex mixture of hydrocarbons with an average molecular weight of 410;
and/or
wherein the succinic acid anhydride sodium salt is a compound of formula (IV)

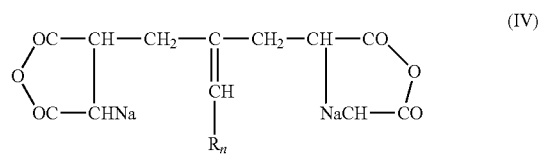

where "R" is polyisobutylene polymer, and where "n"=1 to 30.

7. The fluid composition of claim 4, wherein the tall oil fatty acid is a compound of formula (VI)

$$CH_3(CH_2)_nCH=CH(CH_2)_nCOOH \qquad (VI)$$

where "n"=6 to 7.

8. The fluid composition of claim 4, wherein the fatty alcohol is a compound of formula (VII)

$$CH_3(CH_2)_nOH \qquad (VII)$$

where "n"=11 to 13
and/or
wherein the fatty alcohol ethoxylate is a compound of formula (VIII)

$$CH_3(CH_2)_nO(CH_2CH_2O)_fH \qquad (VIII)$$

where "n"=11 to 15 and "f"=7 to 11.

9. The fluid composition of claim 4, wherein the polyoxyethylene alkyl ether phosphate is a compound of formula (XII)

$$[CH_3(CH_2)_nO(CH_2CH_2O)_f]_yH_{3-y}PO4 \qquad (XII)$$

where "n"=11 to 13 and "f"=2 to 4 and "y"=1 to 2.

10. The fluid composition of claim 4, wherein the ethoxylated cyclohexylamine is a compound of formula (XI)

$$C_6H_{11}N(CH_2CH_2O)nH_2 \qquad (XI)$$

where "n" 2 to 3
and/or
wherein the modified siloxane polymer is a compound formula (XV)

$$(CH_3)_3SiO[(CH_3)_2SiO]_n[CH_3SiOR]_mSi(CH_3)_3 \qquad (XV)$$

where "n" is 12 or greater, "m" is 1 or greater and "R" is a $C_1$ to $C_{10}$ hydrocarbon
and/or
wherein the polyoxyethylene alkyl ether carboxylate is a compound formula (XVI)

$$R-O-(CH_2CH_2O)_nCH_2COOH \qquad (XVI)$$

where "R" is $C_{10}$ to $C_{14}$, "n"=3 to 5.

11. The fluid composition of claim 1, wherein the fluid composition tolerates up to 500 parts per million of hardness of soft and/or hard waters.

12. The fluid composition of claim 1, wherein the fluid composition is a high lubricity semi-synthetic metalworking and/or drilling fluid.

13. The fluid composition of claim 1, wherein the fluid composition is used in amounts of from about 7% to 11% by volume in water.

14. The fluid composition of claim 1, wherein the fluid is free of boron and secondary amines.

15. The fluid composition of claim 1, wherein tramp oil is rejected by the fluid for separation.

16. The fluid composition of claim 1, wherein particulate matter is rejected from the fluid.

17. The fluid composition of claim 1, wherein the fluid is chlorine free.

18. A fluid composition for drilling and/or metalworking in a manufacturing operation, comprising:
a predetermined amount of severely hydrotreated naphthenic oil;
a predetermined amount of monoethanolamine;
a predetermined amount of monoisopropanolamine;
a predetermined amount of water; and
predetermined respective amounts of a plurality of constituents selected from the group consisting of vegetable oil and esters, petroleum sulfonic acid sodium salt, succinic acid anhydride sodium salt, sulfated castor oil, tall oil fatty acid, $C_{23}$ fatty alcohol, fatty alcohol ethoxylate, ethoxylated cyclohexlamine, polyoxyethylene alkyl ether phosphate, tolytriazole sodium salt, modified siloxane polymer, calcium acetate, polyoxyethylene alkyl ether carboxylate, stearate amine, vinyl diol and/or combinations thereof;

wherein the fluid composition is completely soluble in water, has higher tramped oil release, defoams in high turbulence environments, and tolerates high insurgencies of high hardness content of water to remain water soluble under predetermined conditions; and wherein the fluid requires no separate boosters for restoring any desired predetermined properties to the fluid composition.

* * * * *